United States Patent
Gigliotti et al.

(10) Patent No.: US 9,015,335 B1
(45) Date of Patent: Apr. 21, 2015

(54) SERVER SIDE STREAM SWITCHING

(75) Inventors: Samuel S. Gigliotti, Seattle, WA (US);
Matthew B. Cobb, Redmond, WA (US);
David R. Richardson, Seattle, WA (US);
Ethan Z. Evans, Snoqualmie, WA (US);
Ameesh Paleja, Lynnwood, WA (US);
Tal Saraf, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 554 days.

(21) Appl. No.: 12/486,257

(22) Filed: Jun. 17, 2009

(51) Int. Cl.
*G06F 15/16* (2006.01)
*H04N 7/18* (2006.01)
*H04N 7/12* (2006.01)
*G06F 17/30* (2006.01)

(52) U.S. Cl.
CPC .................................. *G06F 17/30017* (2013.01)

(58) Field of Classification Search
CPC ..... H04L 65/80; H04L 65/602; H04L 47/263; H04L 47/25
USPC ............ 709/219, 231–233; 348/419.1, 415.1; 725/96
See application file for complete search history.

(56) References Cited

U.S. PATENT DOCUMENTS

| | | | |
|---|---|---|---|
| 6,243,761 B1 * | 6/2001 | Mogul et al. | 709/246 |
| 6,421,726 B1 | 7/2002 | Kenner | |
| 6,502,125 B1 | 12/2002 | Kenner | |
| 6,647,389 B1 | 11/2003 | Fitch | |
| 6,763,392 B1 * | 7/2004 | del Val et al. | 709/231 |
| 6,789,123 B2 | 9/2004 | Li | |
| 6,850,965 B2 | 2/2005 | Allen | |
| 6,925,651 B2 | 8/2005 | Foster | |
| 7,133,905 B2 | 11/2006 | Dilley | |
| 7,257,640 B1 | 8/2007 | Callocchia | |
| 7,295,520 B2 * | 11/2007 | Lee et al. | 370/236 |
| 7,472,178 B2 | 12/2008 | Lisiecki | |
| 7,502,858 B2 * | 3/2009 | Gupta et al. | 709/226 |
| 7,784,076 B2 * | 8/2010 | Demircin et al. | 725/81 |
| 7,877,776 B2 * | 1/2011 | Krikorian et al. | 725/95 |
| 7,925,774 B2 * | 4/2011 | Zhang et al. | 709/231 |
| 7,962,637 B2 * | 6/2011 | Su et al. | 709/231 |

(Continued)

OTHER PUBLICATIONS

Hassoun, "Dynamic streaming in Flash Media Server 3.5—Part 1: Overview of the new capabilities," Adobe Systems Incorporated, 2009.
Hassoun, "Dynamic streaming in Flash Media Server 3.5—Part 2: ActionScript 3.0 dynamic stream API," Adobe Systems Incorporated, 2009.

(Continued)

*Primary Examiner* — Gregory Todd
(74) *Attorney, Agent, or Firm* — Novak Druce Connolly Bove + Quigg LLP

(57) ABSTRACT

Technology is provided for dynamically adjusting the delivery of content by switching streams during delivery in order to adapt to bandwidth information. A server (or set of servers) storing content transmits one or more portions of a first version of a set content to a client and monitors that transmission (or other transmission) to determine bandwidth information. The server determines whether to switch versions of the set of content based on the bandwidth information. One or more additional portions of the first version of the set of content are transmitted from the server to the client if the server determines that it should not switch versions of the set of content. One or more portions of a second version of the set of content are transmitted from the server to the client if the server determines that it should switch versions. The first version of the set of content and the second version of the set of content are at different quality levels.

17 Claims, 11 Drawing Sheets

(56) References Cited

U.S. PATENT DOCUMENTS

| | | | |
|---|---|---|---|
| 8,099,755 B2* | 1/2012 | Bajpai et al. | 725/94 |
| 2004/0128386 A1* | 7/2004 | Oomoto et al. | 709/226 |
| 2005/0021830 A1* | 1/2005 | Urzaiz et al. | 709/234 |
| 2005/0262257 A1* | 11/2005 | Major et al. | 709/231 |
| 2006/0109915 A1* | 5/2006 | Unger | 375/240.27 |
| 2006/0271979 A1* | 11/2006 | Hejna, Jr. | 725/89 |
| 2007/0025688 A1* | 2/2007 | Pejhan | 386/68 |
| 2008/0133744 A1* | 6/2008 | Ahn et al. | 709/224 |
| 2008/0186849 A1* | 8/2008 | Kampmann et al. | 370/232 |
| 2009/0031384 A1* | 1/2009 | Brooks et al. | 725/127 |
| 2009/0282160 A1* | 11/2009 | Wang et al. | 709/231 |
| 2010/0118114 A1* | 5/2010 | Hosseini et al. | 348/14.09 |
| 2010/0303146 A1* | 12/2010 | Kamay | 375/240.02 |
| 2010/0312828 A1* | 12/2010 | Besserglick et al. | 709/203 |

OTHER PUBLICATIONS

Hassoun, "Dynamic streaming in Flash Media Server 3.5—Part 3: Integrating dynamic streaming with existing video players," Adobe Systems Incorporated, 2009.

Hassoun, "Flash Media Server Article—Dynamic stream switching with Flash Media Server 3," Adobe Systems Incorporated, 2008.

Kapoor, "Action Script guide to dynamic streaming," Adobe Systems Incorporated, 2009.

Dilley, "Globally Distributed Content Delivery," IEEE Internet Computing, Sep./Oct. 2002.

AmazonCloudFront Developer Guide, API Version Jun. 3, 2008, Amazon Web Services LLC 2009.

Kruger, "Client Side Stream Switching," U.S. Appl. No. 12/134,988, filed Jun. 6, 2008.

* cited by examiner

Fig. 5
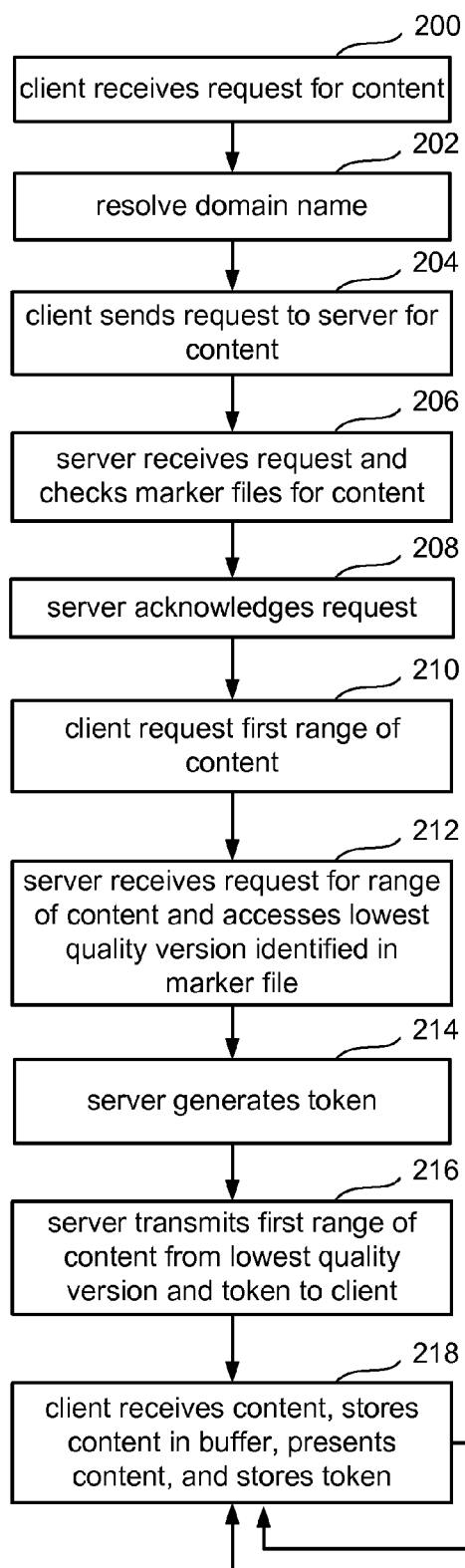
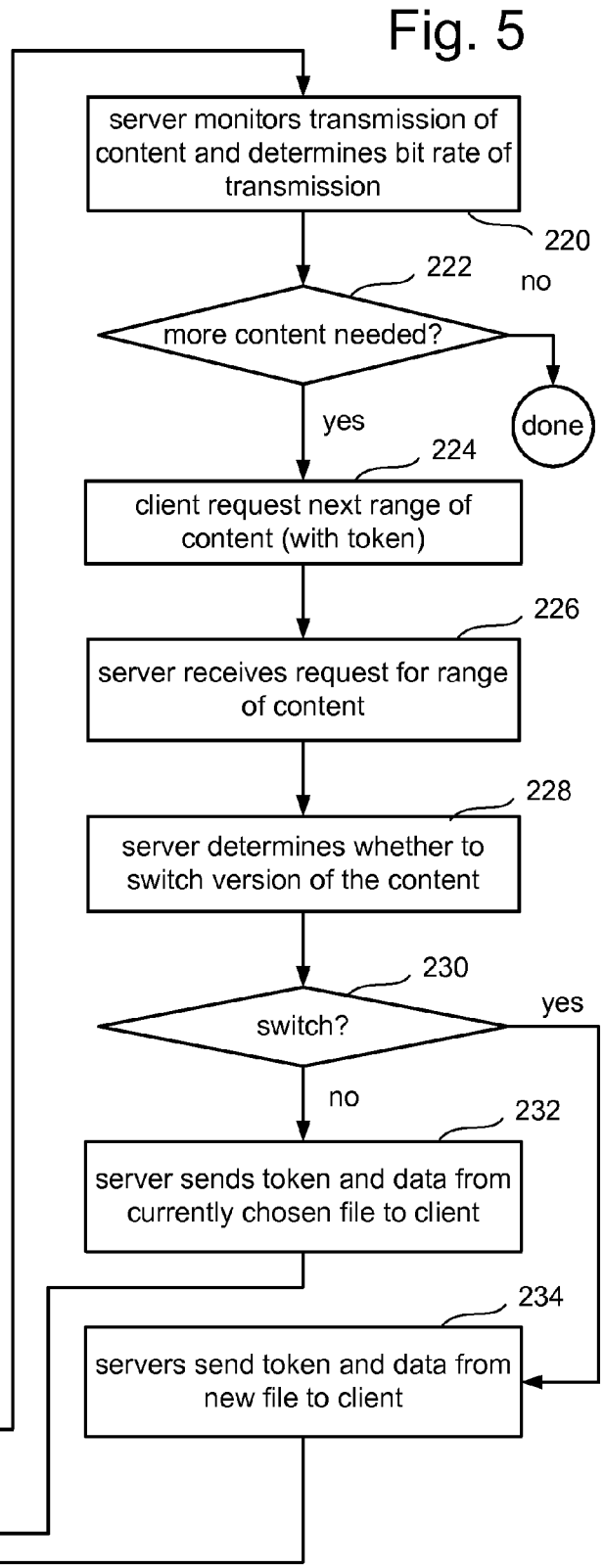

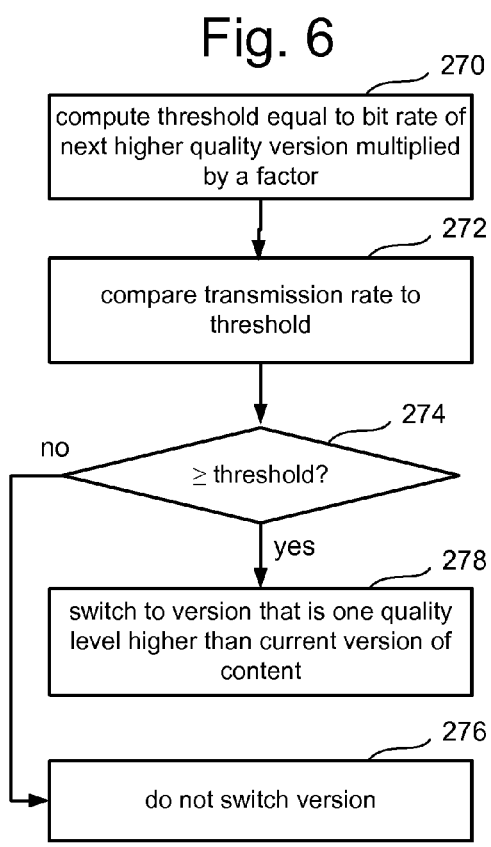
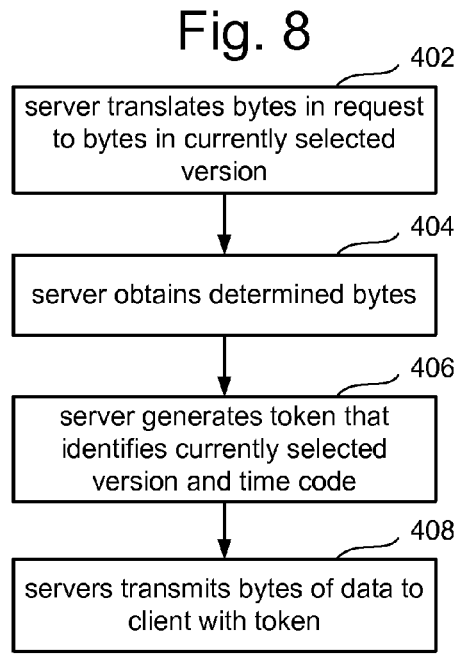
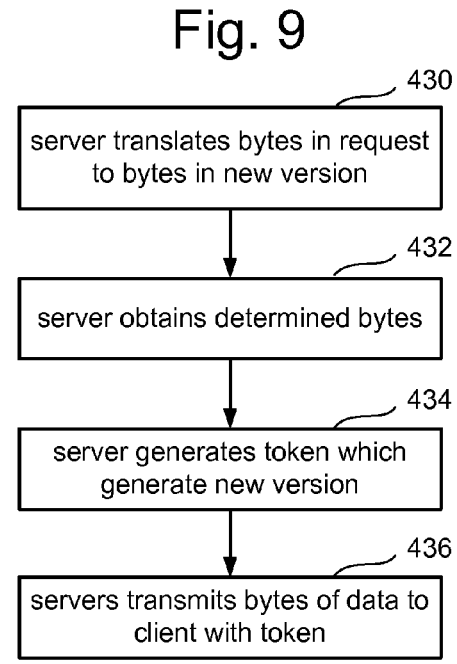

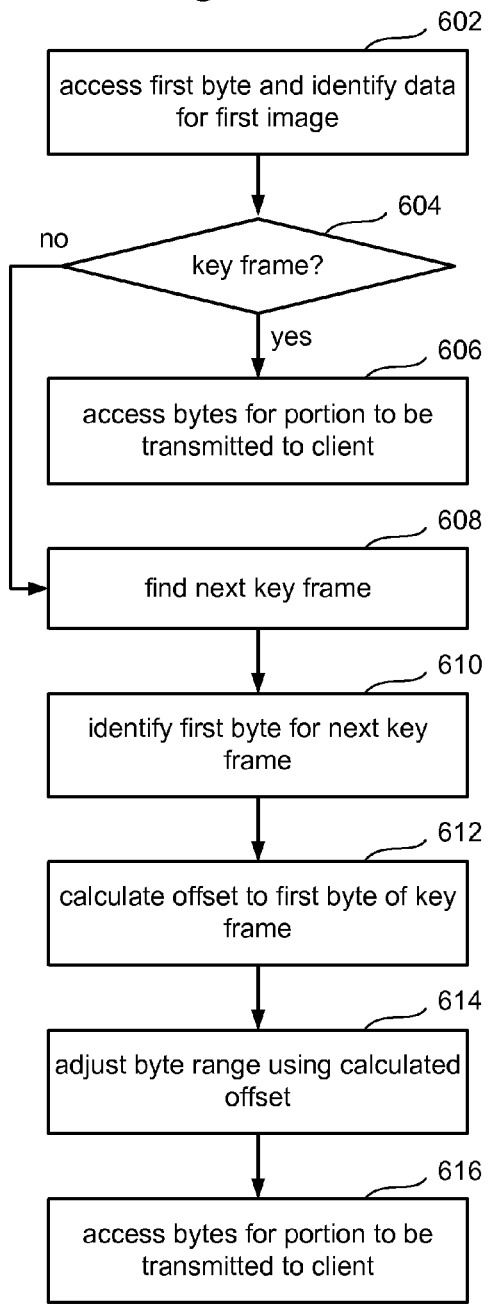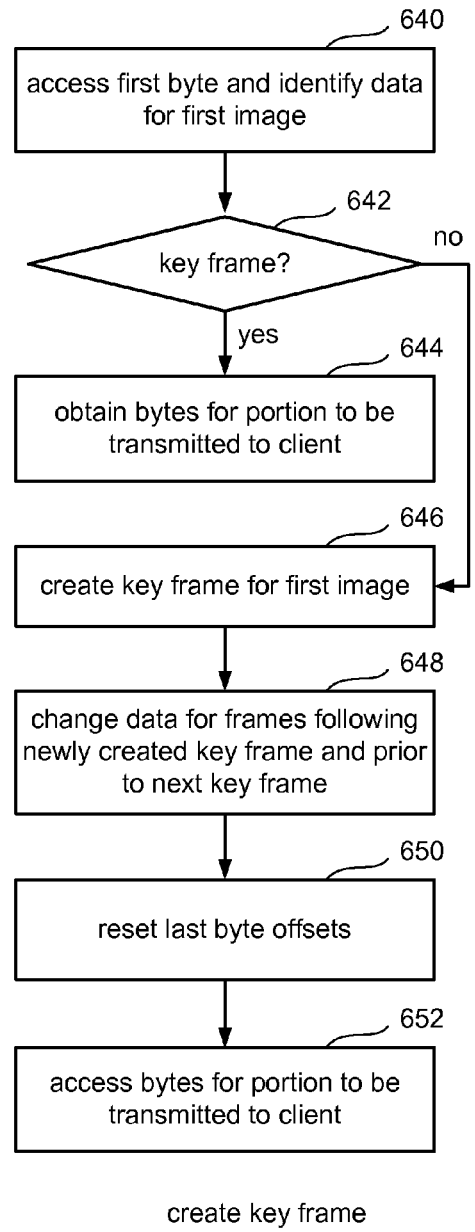

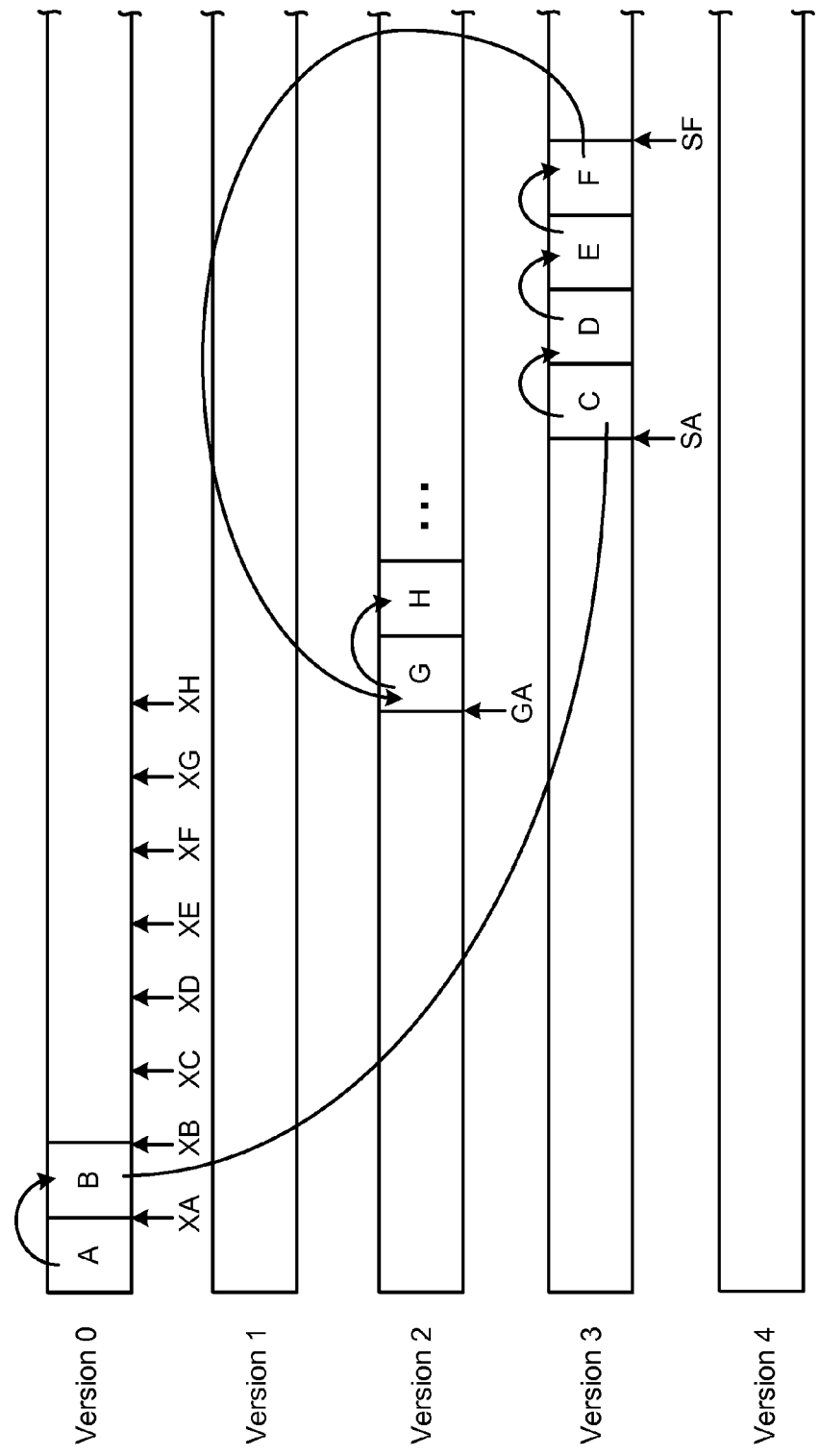

SERVER SIDE STREAM SWITCHING

BACKGROUND

It has become increasingly common for people to access media content over networks. The Internet, in particular, has facilitated downloading and streaming of a wide availability of digital content. Many people are using network access to find, retrieve, and enjoy streaming media rather than relying on traditional content delivery methods such as over-the-air reception, cable transmission, satellite audio/video, and other distribution sources that push media to users typically on a scheduled basis that the user cannot control.

One particular difficulty with streaming media over the Internet is limited bandwidth between a person's computing device and a host. Many people experience undesirable delays in receipt of streaming media or interruptions during play of the stream of media. One solution to expedite receipt of a stream of data is to lower the quality of the media, such as by reducing a bit rate associated with the stream of media. However, people often desire the highest quality stream of media that their equipment can provide. Therefore, it is desirable to improve the quality of streaming media while reducing interruptions that people find undesirable while receiving streaming media.

BRIEF DESCRIPTION OF THE DRAWINGS

FIG. 5 is a flow chart describing one embodiment of a process for providing content to a client using stream switching.

FIG. 6 is a flow chart describing one embodiment of a process for determining whether to switch streams.

FIG. 8 is a flow chart describing one embodiment of a process for sending data.

FIG. 9 is a flow chart describing one embodiment of a process for sending data.

FIG. 14 is a flow chart describing one embodiment of a process for obtaining the appropriate data to be transferred.

FIG. 15 is a flow chart describing one embodiment of a process for obtaining the appropriate data to be transferred.

FIG. 16 shows five data files and an example of how the data stream is switched between the files.

DETAILED DESCRIPTION

As customers of a video on demand service stream video, the bandwidth to their devices can change. Also, the bit rate of the video stream itself can change (e.g., Variable Bit Rate encoding) to account for high action scenes or other reasons. Buffering can alleviate some of the issues, but if a bandwidth drop is sustained, eventually the buffer can run out. Thus, a system is proposed that dynamically adjusts to varying bandwidth by raising or lowering the delivered bit rate of the stream to provide a better customer experience than that produced by forcing the customer to wait for the video to buffer. To allow the system to work with as many clients as possible, the dynamic adjustments are made at the server side rather than the client side.

In general, a server (or set of servers) stores multiple versions of a set of content. For example, the content may be a movie and the server may store multiple versions of the movie. Each version depicts the same movie; however, each version is at a different quality level. In one implementation, each version is at a different bit rate. Most users want to see the highest quality version their system can deliver. Accordingly, the highest bit rate that can be supported by a client's network bandwidth should be transmitted to the client. If the client's bandwidth changes during the streaming (or other type of delivery) of the content to the client, the server can dynamically adjust by switching the version it is sending to the client (e.g., switching to a version with a higher or lower bit rate, as appropriate). In such an arrangement, the server will transmit one or more portions of a first version of the content to a client and monitor that transmission (or other transmission) to determine bandwidth information (e.g., transmission rate). The server determines whether to switch versions of the content based on the bandwidth information. One or more additional portions of the first version of the content are transmitted from the server to the client if the server determines that it should not switch versions of the set of content. One or more portions of a second version of the content are transmitted from the server to the client if the server determines that it should switch versions. This process repeats until the content has been completely transmitted. Content other than video can also be used with the technology described herein.

Figure 1:
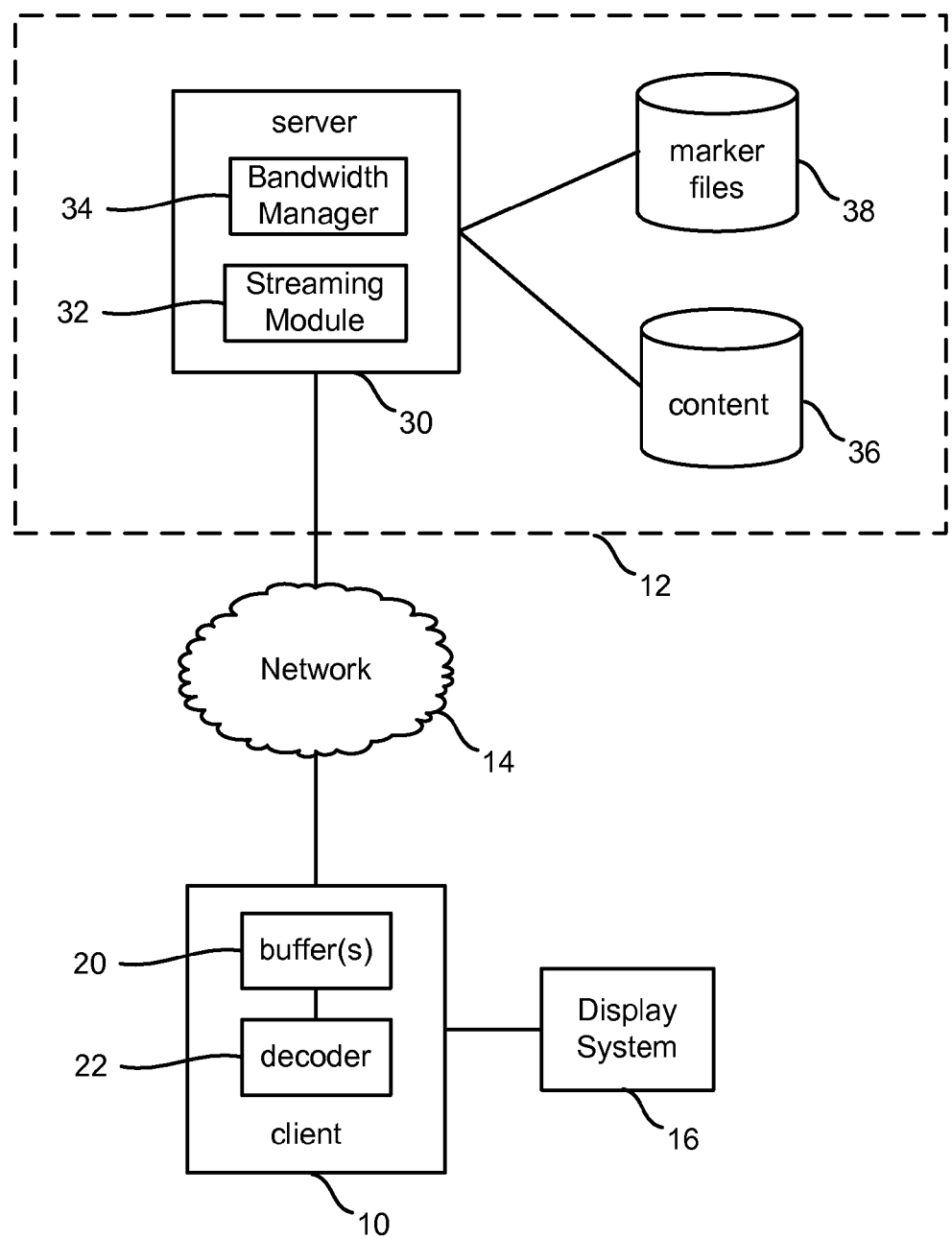
FIG. 1 is a block diagram depicting one embodiment of components that can perform stream switching as described herein.

FIG. 1 is a block diagram of components that can be used to dynamically adjust the delivery of content by switching streams during delivery in order to adapt to bandwidth information or other data. FIG. 1 shows a client 10 in communication with content provider 12 via a network 14. Network 14 can be the Internet or other communications link. Those skilled in the art will appreciate that the network 14 may be any wired network, wireless network or combination thereof. In addition, the network 14 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

Client 10 can be any computing device that can display, play or otherwise present content to a user. Examples of client 10 include a desktop computer, notebook, laptop or tablet computer, telephone, mobile device, personal digital assistant (PDA), hybrid PDA/mobile phone, smart phone, set top box, television, stereo, electronic book reader, personal media player, digital video recorder, DVD player, Blue-ray player, camera, etc. In some embodiments, client 10 includes a display system (e.g., CRT, LCD, plasma screen or other display device), while in other embodiments client 10 is in communication (wired or wireless) with an external display system 16 (e.g., television, computer, monitor or other display device).

Some embodiments of client 10 include one or more buffers 20 and a decoder 22. The one or more buffers 20 store content received from content provider 12. In one embodiment, client 10 includes one buffer for temporarily storing content and playing that content. In other embodiments, client 10 will have two or more buffers so that content will be streamed into one buffer while it is played from another buffer. Since some content is encoded using various encoding schemes known in the art, client 10 includes decoder 22 for decoding the content from the one or more buffers 20.

In the illustrated embodiment, content provider 12 includes a server 30 for providing content to client 10. Server 30 includes a Streaming Module 32 and Bandwidth Manager 34, both of which are software components. Streaming Module 32 manages the streaming of content from server 30 to client 10. In embodiments that deliver content in a manner other than streaming, Streaming Module will be replaced by another software component for managing the implemented delivery of content. Bandwidth Manager 34 is a software process that selects the appropriate version of the content, and portion(s) of that selected version, to send to client 10. Once Bandwidth Manager 34 selects a set of bytes to send to client 10, it provides those bytes to Streaming Module 32 for transmission to client 10. In some embodiments, server 30 can be implemented using multiple servers that are load balanced or otherwise share the load of requests for content.

Server 30 is in communication with data store 36 and data store 38. Data store 36 stores content. Examples of content include, but are not limited to, videos (e.g., movies, television programs, etc.), music, electronic books, audio books, multimedia, photos, and data. Other types of content can also be stored. As described above, data store 36 may store multiple versions of each item of content, with each version being at a different quality level. For example, if the content is a video then data structure 36 may store five versions of the video, and each version will be at a different bit rate. One embodiment includes storing versions of video at the following five bit rates: (1) 300K bits/second, (2) 600K bits/second, (3) 900K bits/second, (4) 1.2 M bits/second and (5) 2.5M bits/second. Other bit rates can also be used, and the data store 36 can store more than or less than five versions of the content.

Note that video content can be stored as a constant bit rate or a variable bit rate. For example, video content stored with a constant bit rate may have one of the five bit rates identified above applied throughout the entire video. Video content stored with a variable bit rate may have a bit rate that changes during the video; for example, to account for action scenes that need more data to render the images. Video content with a variable bit rate will have an average bit rate and a maximum bit rate. If the server transmits video content with a variable bit rate, one of the five bit rates identified above (or other bit rates) may represent the average bit rate.

In one embodiment, data store 38 stores marker files. Each marker file stores an indication of each version of the content and where each version is stored in data store 36. In one embodiment, there is one marker file for each item of content. Using the example discussed above, the marker file for an item of video content may store a pointer or link to each of the five versions of the content. One example of a marker file may include the following information:

300 k file/12345/file1.mp4;
600 k file/12345/file2.mp4;
900 k file/12345/file3.mp4;
1.2 m file/12345/file4.mp4; and
2.5 m file/12345/file5.mp4.

Together, the server 30 uses the data stores 36 and 38 to locate and access content to be transmitted to the client 10 using the technology described herein. While the data stores 36 and 38 are depicted in FIG. 1 as being local to the server 30, those skilled in the art will appreciate that the data stores 36 and 38 may be remote to the server 30 and/or may be network-based services themselves. In addition, while data stores 36 and 38 are depicted in FIG. 1 as being separate, they may, in some embodiments be combined.

Figure 2:
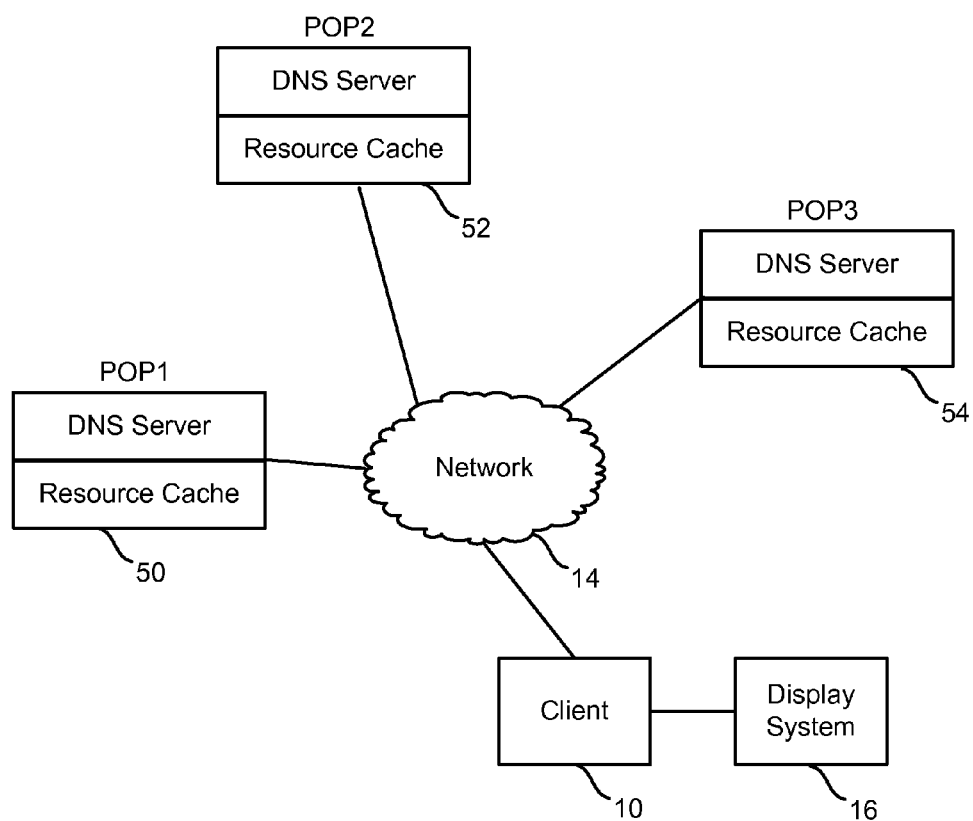
FIG. 2 is a block diagram depicting one embodiment of components that can perform the stream switching described herein.

FIG. 2 is a block diagram of a second embodiment of components that can be used to dynamically adjust the delivery of content by switching streams during delivery in order to adapt to bandwidth information or other data. More specifically, FIG. 2 depicts a Content Delivery Network ("CDN"). In general, a CDN maintains a geographically dispersed network of edge locations that can each store copies of content. Each edge location, also referred to as a Point of Presence ("POP"), can include one or multiple servers. Requests for content from clients are routed to the nearest edge location so the content is delivered with, e.g., increased performance, better quality of service, decreased cost, etc. Edge locations may be data centers that are able to respond to requested loads during peak times, or they may be streaming servers, web servers, etc. or combinations thereof.

FIG. 2 shows client 10 in communication with network 14. Also connected to network 14 are first Point Of Presence 50 ("POP1"), second Point of Presence 52 ("POP2"), and third Point Of Presence 54 ("POP3"), all three of which comprise the CDN. In some embodiments, the CDN may have less than three POPs or more than three POPs. In general, the CDN-based system seeks to have multiple copies of original content stored at different POPs. In one embodiment, the various POPs will be located around the world (or another region) so that for each user who requests content, there will be a POP relatively local to that user. By obtaining a copy of the content from a local POP rather than one central server, users will receive the content much quicker.

Each POP (e.g., POP1, POP2 and POP3 of FIG. 2) includes a Domain Name System ("DNS") component made up of one or more DNS-based servers for resolving DNS queries from clients. Each POP also includes a Resource Cache component made up of one or more Resource Cache servers for storing resources (e.g., copies of content) from content providers and transmitting various requested resources to various clients. In one embodiment, the Resource Cache servers can be in the form of server 30 of FIG. 1. The DNS component and the Resource Cache component are considered to be logically grouped, regardless of whether the components, or a portion of the components, are physically separate. Although the POPs that are illustrated in FIG. 2 are logically associated with a CDN provider, the POPs will be geographically distributed in a manner to best serve the various demographics of clients.

In one embodiment, the CDN-based system will utilize Anycast to facilitate the selection of a DNS server to receive the DNS query by client 10. In accordance with Anycast principles, the DNS components of multiple POPs share the same IP address. Client 10 will request and receive an IP address associated with the domain name of the CDN. For example, CDNprovider.com may resolve to an IP address. The transmittal of a DNS query to the shared IP address will be received by a POP that has the closest network proximity between the DNS resolver component in the client and the various POPs associated with the CDN provider (e.g., the POP with the least amount of network hops to the client).

Figure 3:
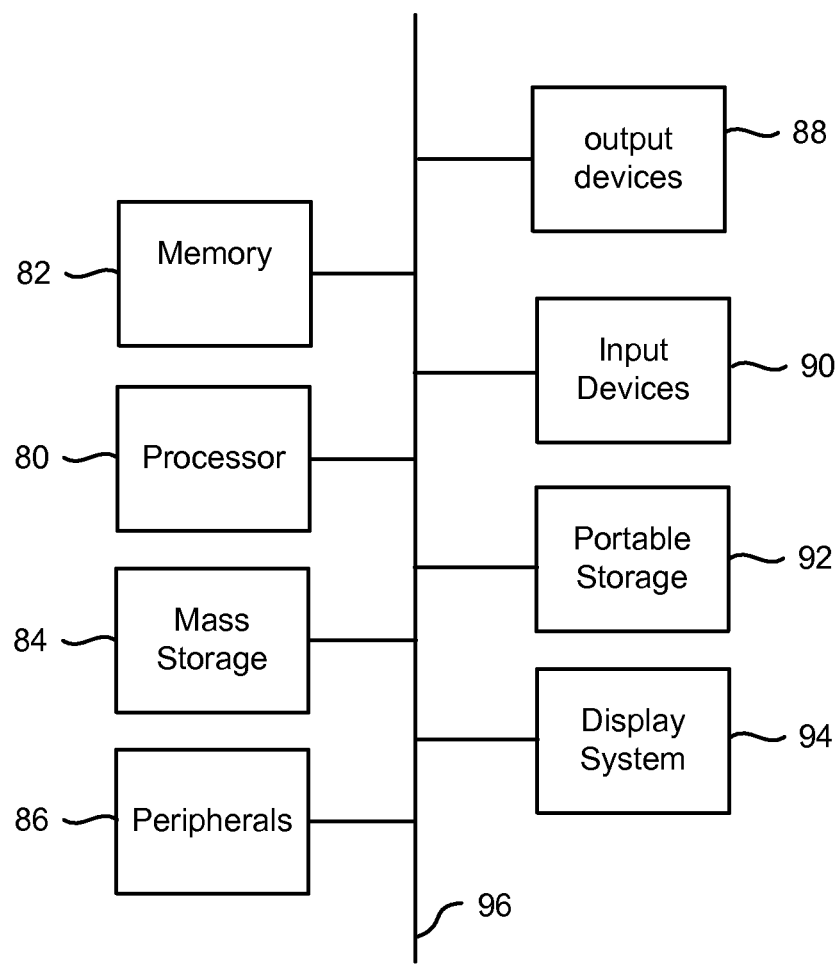
FIG. 3 is a block diagram depicting one embodiment of the components of a computing device.

FIG. 3 is a high level block diagram of a computing system which can be used to implement any of the computing devices of FIG. 1 or FIG. 2. The computing system of FIG. 3 includes processor 80, memory 82, mass storage device 84, peripherals 86, output devices 88, input devices 90, portable storage 92, and display system 94. For purposes of simplicity, the components shown in FIG. 3 are depicted as being connected via a single bus 96. However, the components may be connected through one or more data transport means. In one alternative, processor 80 and memory 82 may be connected via a local microprocessor bus, and the mass storage device 84, peripheral device 86, portable storage 92 and display system 94 may be connected via one or more input/output buses.

Processor 80 may contain a single microprocessor, or may contain a plurality of microprocessors for configuring the computer system as a multiprocessor system. Memory 82 stores instructions and data for programming processor 80 to implement the technology described herein. In one embodiment, memory 82 may include banks of dynamic random access memory, high speed cache memory, flash memory, other nonvolatile memory, and/or other storage elements. Mass storage device 84, which may be implemented with a magnetic disc drive or optical disc drive, is a nonvolatile storage device for storing data and code. In one embodiment, mass storage device 84 stores the system software that is loaded into memory 82 to program processor 80 to implement the technology described herein. Portable storage device 92 operates in conjunction with a portable nonvolatile storage medium, such as a floppy disc, CD-RW, flash memory card/drive, etc., to input and output data and code to and from the computing system of FIG. 3. In one embodiment, system software for implementing the present invention is stored on such a portable medium, and is input to the computer system via portable storage medium drive 92.

Peripheral devices 86 may include any type of computer support device, such as an input/output interface, to add additional functionality to the computer system. For example, peripheral devices 86 may include one or more network interfaces for connecting the computer system to one or more networks, a modem, a router, a wireless communication device, etc. Input devices 90 provide a portion of a user interface, and may include a keyboard or pointing device (e.g., mouse, track ball, etc.). In order to display textual and graphical information, the computing system of FIG. 3 will (optionally) have an output display system 94, which may include a video card and monitor, and/or an interface to a television/projector/stereo/switching device in conjunction with or separate from the television/projector/stereo/switching device. Output devices 88 can include speakers, printers, monitors, network interfaces, etc.

The components depicted in the computing system of FIG. 3 are those typically found in computing systems suitable for use with the technology described herein, and are intended to represent a broad category of such computer components that are well known in the art. Many different bus configurations, network platforms, operating systems can be used. The technology described herein is not limited to any particular computing system.

Figure 4:
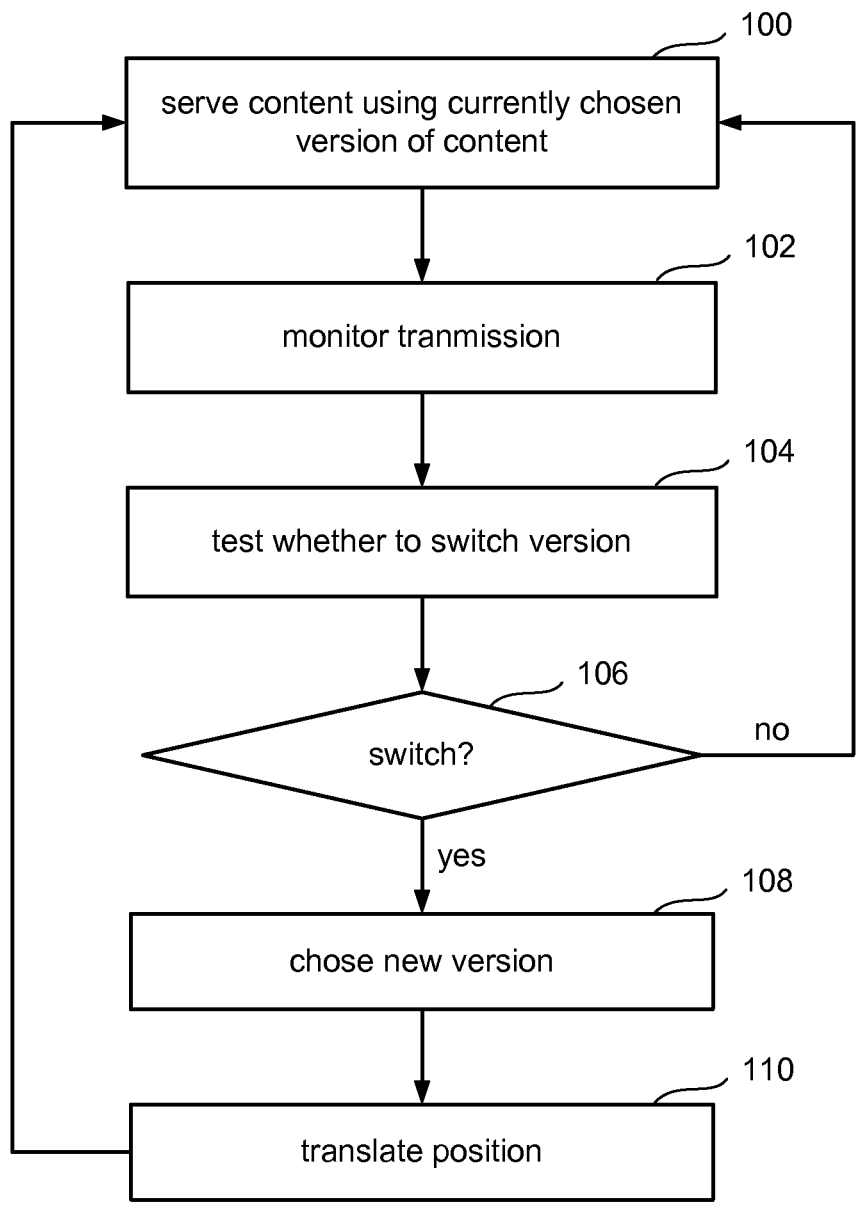
FIG. 4 is a flow chart describing one embodiment of a process for providing content to a client using stream switching.

FIG. 4 is a high level flow chart describing one set of embodiments of operating the components of FIG. 2 or 3 to dynamically adjust the delivery of content by switching streams during delivery in order to adapt to bandwidth information or other data. In block 100, the server (e.g., server 30 of FIG. 1 or one of the Resource Caches of FIG. 2) serves content to client 10 using the currently chosen version of the content (for example purposes only, referred to as Version A). Using the example discussed above, the content is video content. Accordingly, at any one point in time, one of the five above-listed versions of the video content will be the currently chosen version. Block 100 includes the server transmitting a portion of the content (e.g., N bytes of a video content file) to client 10. In block 102, the server monitors the transmission of the portion of content to determine a transmission rate (e.g., bandwidth). Alternatively, the server can determine transmission rate from monitoring test data (rather than the actual data). In some implementations, the server can determine the transmission rate by monitoring the delivery rate of the Transmission Control Protocol ("TCP") connection with the client. TCP specifies that the client receiving the content sends an acknowledgement when it receives each segment of data. By keeping track of how long, on average, it takes to receive each of the acknowledgements the server can estimate transmission rate (or bandwidth). Alternatively, the server can determine transmission rate (bandwidth) by determining how long it took to receive the last acknowledgement for the portion of the content sent in response to a specific request from the client.

In another embodiment, a TCP window can be used when determining transmission rate (or bandwidth). For example, a TCP window indicates the amount of outstanding (unacknowledged by the recipient) data a sender can send on a particular connection before it gets acknowledgement back from the receiver that it has received some of the data. For example, if a pair of hosts are talking over a TCP connection that has a TCP window size of 64 KB, the sender can only send 64 KB of data and then must stop and wait for an acknowledgement from the receiver that some or all of the data has been received. If the receiver acknowledges that all the data has been received, the sender is free to send another 64 KB. If the sender gets back acknowledgement from the receiver that the receiver only received the first 32 KB (which could happen if the second 32 KB was still in transit or lost), the sender can only send another 32 KB since it cannot have more than 64 KB of the unacknowledged data outstanding. If the sender does not receive acknowledgement that any of the 64 KB has been received, then the current window is at zero and the sender cannot send any more data. By monitoring when the window is at zero and then changed to another value from zero, an estimate can be made of the bandwidth of the client. For example, the server can send data at various transmission rates and see whether the TCP window closes or opens at each of the transmission rates. From the data about which transmission rates cause the TCP window to open up and which transmission rates cause the TCP window to close, the server can estimate the bandwidth of the client. Other means for determining transmission rates/bandwidth can also be used. No particular scheme is required.

In block 104, the server determines whether to switch the version of the content being delivered to the client 10. In one embodiment, the determination whether to switch the version of the content is performed based on the monitoring of the transmission in block 102. If the client can handle more data per unit of time, the server can switch to a higher quality version (e.g., higher bit rate) of the content. If the client can only handle less data per unit of time, the server can switch to a lower quality version (e.g., lower bit rate) of the content.

If the server determines not to switch versions (decision block 106), then the process returns to block 100 and the server transmits the next portion of content from the currently chosen version (Version A). If the server determines that it should switch versions (decision block 106), then the process continues at block 108 and the server chooses a new version (for example purposes only, referred to as Version B) to transmit to client 10. In block 110, the server translates its byte position in Version A to a new position in Version B. Since Version A and Version B are at different bit rates, the same point in time of the video content is at different byte positions in Version A and Version B. Therefore, when the server switches from Version A to Version B, it will translate the byte offset from Version A to a corresponding byte offset in Version B. In one embodiment, time codes in each version can be used to translate the byte offsets.

FIG. 5 is a flow chart a more detailed embodiment of a process implemented by the components of FIG. 2 or 3 to dynamically adjust the delivery of content by switching streams during delivery in order to adapt to bandwidth information or other data. In block 200, client 10 receives a request for content. For example, a client may request to view a movie. In one embodiment, the client 10 will provide a user with a menu of options. Each option may be associated with a Uniform Resource Identifier ("URI") that specifies where the desired content may be located and the mechanism for accessing it. The URI typically includes, inter alia, a domain name and a path to the file to be retrieved. When the user selects the option, the associated URI will be used to obtain the chosen movie (or other content). In block 202, the domain name included in the URI is resolved to an IP address using standard domain name resolution techniques known in the art. In block 204, client 10 sends a request to the server identified by the resolved IP address for the content. More specifically, the request is an HTTP request to the IP address obtained from the domain name resolution. In block 206, the server 30 receives the request and locates the marker file associated with the particular movie (or other content) in marker file data store 38. Server 30 will read the appropriate marker file to determine which versions of the content server 30 has available for transmission to the client 10. In one embodiment, the marker file includes information about the various versions including bit rate, location, number of bytes in the appropriate file, duration of the content, and other bibliographic information. In other embodiments, server 30 will access the actual content file (e.g., as stored in data store 36) to obtain that information.

In block 208, server 30 acknowledges the request for the content to the client. In one embodiment, the server will provide an HTTP reply acknowledging the HTTP request sent by client 10. In one embodiment, the acknowledgement will include the length of the content in bytes. When multiple versions of a content exist, then server 30 will only provide the number of bytes associated with the highest quality version. In other embodiments, other versions can be used to provide the number of bytes.

In block 210, after receiving acknowledgement from the server, client 10 will request the first range of content. In one embodiment, the client will request portions of the video file. When it receives the requested portion, it will store that portion in its buffer, begin to play that portion, and request additional one or more portions to fill the one or more buffers as the content is being presented, e.g., as the movie is being played. There are many ways for a client to request portions of content. In one embodiment, the client will use HTTP to electronically request the content. For example, a GET command can be used. However, in other embodiments, other protocols (including proprietary protocols) can also be used. When using HTTP, a client can use a Range header. That is, HTTP allows the requesting device to include headers in the HTTP request. One of those headers can be a Range header that indicates a byte range. For example, if the client was requesting the first one thousand bytes, one of the headers in the HTTP request would be "Range:bytes=0-999." For example, the client may send the following request:

http://www.contentprovider.com/NameOfTheMovie, with header data of Range:bytes=0-999.

In another embodiment, the client will make a request to a server side script, so the initial request might look like:

http://www.contentprovider.com/dynamic?ref=12345

The server side script (dynamic) or other software component running on server 30 will look-up the reference in a file/database/service associated with (or on) server 30 to get the corresponding marker file.

In another embodiment, the client can use query strings to indicate a byte range for the content. Examples of query strings include "?start=0000&end=0999." This query string indicates that the user wants bytes starting at byte 0000 and ending at byte 999. In another embodiment, a client and server can use a proprietary protocol which allows for the transferring of portions of files.

In block 212, server 30 receives a request for the first range of content (e.g., byte 0-999), looks-up the appropriate marker file in the data store 38, and accesses the lowest quality version identified in the marker file. That is, in one embodiment, server 30 will initially start sending data from the lowest quality file in order to allow the content to start playing for the user as soon as possible. In other embodiments, server 30 can start sending data from a different version. In block 214, server 30 will generate a token. In one embodiment, the token is header data which indicates which version of the content is being served with the current response and identifies a time code or byte offset for the last byte of data provided in this particular response. In another embodiment, the token identifies a time code or byte offset for the next byte after the last byte of data provided in this particular response. In other embodiments, the token can be provided in a different form.

In block 216, the server transmits an HTTP reply with the first range of content from the lowest quality version and the token to client 10. In block 218, client 10 receives the portion of content requested, stores that content in one or more buffers, presents that content to the user, and stores the token for future use.

While the content is transmitted from server 30 to client 10 (blocks 216 and 218), the server monitors the transmission of the content and determines the bit rate of transmission in block 220, as discussed above. In block 222, client 10 determines whether more content is needed. For example, client 10 will determine whether it has the entire content or needs more bytes of data for the content. If no more content is needed by client 10 (decision block 222), the process of FIG. 5 is completed. If more content is needed (decision block 222), then client 10 will request the next range of content by transmitting another HTTP request to the server 30 That HTTP request will include the token received in block 218. One example of such an HTTP request includes the following:

http://www.contentprovider.com/NameOfTheMovie?tokenID=versionID&tokenTimeCode=TIME.

The HTTP request may also include the Range headers for the particular range of the content requested. In block 226, server 30 will receive the request for the range of content. In block 228, server 30 will determine whether to switch versions of the content. If the server determines that the version does not need to be switched (decision block 230), then server 30 will generate an updated token and send the requested data with the updated token to client 10 in block 232. After block 232, the process loops back to block 218. If server 30 determines to switch the version (decision block 230), then server 30 will generate and send a new token, and send the appropriate data from the new file to client 10 in block 234. More details of blocks 232 and 234 are provided below.

In one embodiment, after the server has determined a bit rate for delivery of content to a particular client, that bit rate is stored for future use. The next time that client requests data to be transmitted, the server will transmit the first set of the content at the stored bit rate. For example, if the process of FIG. 5 settles at a bit rate of 2.5M when sending a first movie to a client, the when that same client requests a second movie from the server, the first portion of the second movie will be transmitted (see block 216) at a bit rate of 2.5M and then the remainder of the process of FIG. 5 will be performed.

FIG. 6 is a flow chart illustrating one embodiment of a process performed by server 30 to determine whether to switch versions of content. The process of FIG. 6 is one example of implementing block 228 of FIG. 5. In block 270, server 30 will compute a threshold that is used to determine whether to switch versions. In one embodiment, the threshold is equal to the bit rate of the next higher quality version multiplied by a factor. For example, if the server is currently serving data from the version having a bit rate of 600 k then, in block 270, server 30 will compute a threshold (TH) equal to the bit rate of the next higher version (e.g., 900 k) multiplied by some factor K, where TH=(900 k)×(K). The value of K can be determined on an experimental basis. In some embodiments, K is set so that the threshold is greater than the average bit rate but less than the maximum bit rate, for a variable bit rate file. In one embodiment, the same factor will be used when determining thresholds for all the different quality versions. In another embodiment, each version will have its own factor. In one example, the factor will be lower for lower quality versions because it is desired to encourage the switching from the lowest quality version to higher quality versions. In other embodiments, different factors can be used for different types of shows. For example, in a news show, there is little to gain from a higher quality video so only make the change if the client can easily handle it by using a large factor. But with actions shows, the system wants to encourage the switch to higher quality so it will use a lower factor. One example of a factor is K=1.3.

In block 270, server 30 will compare the latest transmission rate determined in block 220 of FIG. 5 with the threshold determined in block 270. If the transmission rate is not greater than or equal to the threshold (block 274), then the server determines that it should not switch versions (block 276). If, however, the transmission rate is greater than or equal to the threshold (block 274), then server 30 determines to switch to the version that is one quality level higher than the current version of content (block 278).

Figure 7:
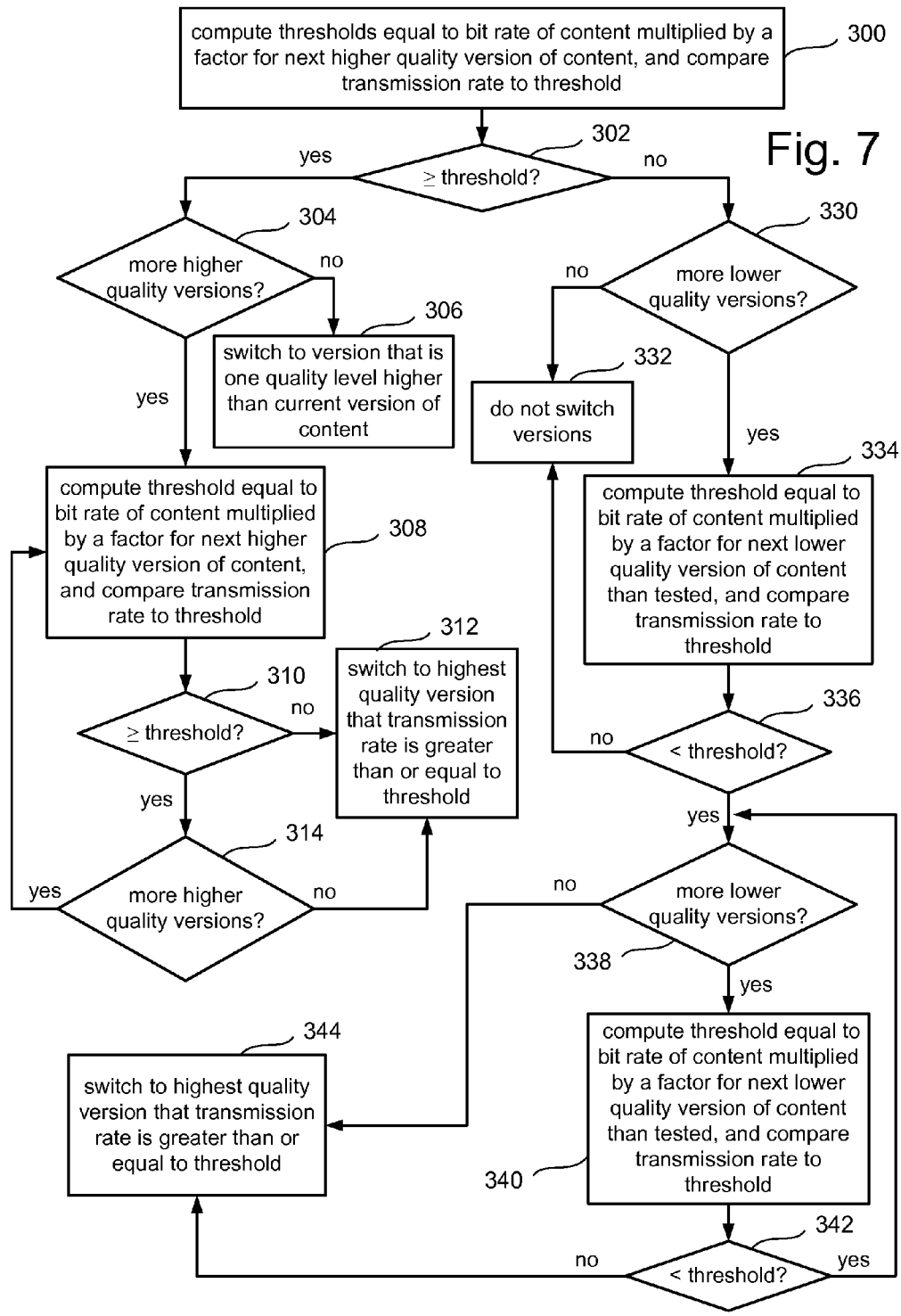
FIG. 7 is a flow chart describing one embodiment of a process for determining whether to switch streams.

The process of FIG. 6 provides an example of the server determining whether to switch to the next higher quality version. FIG. 7 is a flow chart depicting an alternative version in which the server determines whether to switch to any of the higher quality or lower quality versions. In block 300 of FIG. 7, server 30 computes a threshold equal to the bit rate of the content for the next higher quality version of content multiplied by a factor (similar to block 270) and compares that threshold to the transmission rate (similar to block 272). If the observed transmission rate (determined in block 220) is greater than or equal to the threshold (block 302), then in block 304 server 30 determines whether there are any more higher quality versions than the one just tested. If not, then server 30 will determine to switch to the version that is one quality higher than the current version of content in block 306. If there are more higher quality versions (block 304), then in block 308 the server will compute a threshold equal to the bit rate of the content for the next higher quality version than previously tested multiplied by a factor. For example, if the server is currently serving data from the 300 k version and the server tested a threshold for the 600 k version in block 300, then in this iteration of block 308 a threshold will be computed for the 900 k version. That threshold is compared to the currently observed rate of transmission (block 220) in block 308. If the rate of transmission is greater than or equal to the threshold computed in the current performance of block 308, then in block 314 server 30 will determine whether there are any more higher quality versions than just tested. If so, the process will loop back to block 308 and compute a threshold for that next higher quality version. If, in block 310, it is determined that the transmission rate is not greater than the currently generated threshold, or in block 314 it is determined that there are no more higher quality versions, then server 30 will determine to switch to the highest quality version for which the transmission rate was greater than or equal to the corresponding threshold (block 312).

Consider the following example in relation to blocks 304-314. Assume an observed transmission rate of 975K. Server 30 is currently serving from the 300 k version of a movie. In block 302, server 30 determines that the observed transmission rate is greater than 450 k (assuming that the factor K=1.5). Then, in block 304, server 30 will determine that there are more higher quality versions so server 30 will compute a threshold for the 600 k version (assuming the five versions discussed above). In block 310, server 30 determines that the transmission rate is greater than 900 k (600 k×1.5), so the process will loop back to block 308 and test whether the observed transmission rate is greater than 1350 k (900 k×1.5). In this iteration of block 310, server 30 determines that the transmission rate is not greater than 1350 k. Therefore, in block 312 server 30 concludes to switch to the 600 k version of the movie.

Looking back at FIG. 7, if in block 302 server 30 determines that the currently observed transmission rate is not greater than or equal to the threshold computed in block 300, then in block 330 server 30 will determine whether there are any more lower quality versions. If there are no more lower quality versions then server 30 concludes that it should not switch versions (block 332). If, in block 330, it is determined that there are more lower quality versions (e.g., based on the marker file associated with the content), then in block 334 server 30 will compute a threshold equal to the bit rate of the version of the content for the next quality version lower than the version tested in block 300 multiplied by the factor. That threshold will be compared to the currently observed transmission rate. If the currently observed transmission rate is not less than the threshold computed in block 334 (block 336), then server 30 will conclude that it should not switch versions of content in block 332.

If (see block 336) the most recently observed transmission rate is less than the threshold computed in block 334, then server 30 will determine whether there are any more lower quality versions (block 338). If so, server 30 will compute a threshold equal to the bit rate of the content of the next lower quality version multiplied by the appropriate factor. The currently observed transmission rate will be compared to this newly computed threshold. If the currently observed transmission rate is less than the threshold computed in the last iteration of block 340, the process loops back to block 330 to determine whether there are any more lower quality versions lower than the version just tested. The point of the loop of blocks 338-342 is to find the highest bit rate version of the lower quality versions (as compared to the current version) that has its appropriate threshold greater than or equal to the currently observed transmission rate. When server 30 determines that there are no more lower quality versions (see block 338) or that the currently observed transmission rate is not less than the most recently computed threshold (see block 342), then server 30 will determine to switch to the highest quality version for which the transmission rate is greater than or equal to the threshold (block 344).

Consider the following example for blocks 330-344. Assume that server 30 is currently serving data from the 900 k version of a movie, the factor K=1.5 and the most recently observed transmission rate is 700 k bits per second. In block 300, the threshold computed would be 1350 k which is greater than the transmission rate. In block 330, system 30 determines that there are more lower quality versions and computes a threshold for the 600 k version in block 334. That threshold will be equal to 900 k, which is greater than the current transmission rate. Therefore, in block 338, the system will determine that there are more lower quality levels and compute a threshold for the 300 k. In this case, the threshold (450 k) is less than the current transmission rate. Therefore, the test in 342 will fail and block 344 will switch the version to the 300 k version.

In block 232 of FIG. 5, the server generates and sends a new token and sends data from the currently chosen file to client 10, without switching versions. FIG. 8 is a flow chart describing one example implementation of block 232. In block 402, server 30 translates bytes in the request to bytes in the currently selected version of content. When client 10 first requested the content, server 30 replied with the number of bytes in the content using the number of bytes in the highest quality version. As discussed herein, server 30 may change which version it is serving, however client 10 will not know about the change. Client 10 will always assume that it is receiving data from only one version having a total number of bytes equal to the number of bytes replied to by server 30 in block 208. Note that in some embodiments, when the server responds to the initial request, the server may not provide a number of bytes in the video file. Either way, the client believes it is always receiving data from the same file and does not know about the switching. Thus, client 10 will continue to request the next set of one thousand bytes (or another number of bytes) regardless of which file it is receiving data from. The byte range in the request need to be translated to a byte range in the currently selected version of the content. If the server has only served data from the lowest quality version, then the byte ranges in the request from the client will match the byte offsets in the lowest version file. However, if the server has switched versions one or more times, the byte range in the HTTP request from the client will not match the byte offset in the file currently being served. For example, bytes 0-999 of the lowest quality version may correspond to the same portion of the content as byte 0-2322 of the 600 k version and byte 0-3799 of the highest quality version. Additionally, bytes 3000-3999 of the lowest quality version may correspond to bytes 5823-6342 of the 1.2 m version. Thus, in block 402, server 30 will translate the byte numbers in the range request from the client 10 to byte offsets in the file for the version currently being served by server 30. More detail for block 402 is provided below with respect to FIG. 10.

In block 404 of FIG. 8, server 30 obtains the bytes determined by the translation process of block 402. These bytes are obtained from the appropriate file stored in data store 36. In block 406, the server will generate the token that identifies the currently selected version and a time code associated with the last byte obtained in block 404. Note that time codes are stored in the media files. In some embodiments, the server may need to interpolate between time codes to get the exact time code for the last byte. In block 408, the server will send the bytes of data obtained in block 404 and the token generated in block 406 to the client 10.

In block 234 of FIG. 5, the server sends, to client 10, the token and data from the file just switched to. FIG. 9 is a flow chart describing one embodiment of a process used to implement block 234. In block 430 of FIG. 9, server 30 translates the bytes in the HTTP request received from the client to bytes in the new version of the content. In block 432, the server obtains the bytes determined in the new version of the content. In block 434, server 30 will generate a token which identifies the new version of the content (e.g., identifies the file associated with the new version) and a time code for the last byte obtained in block 432. In block 436, server 30 transmits the bytes of data and the token to client 10.

Figure 10:
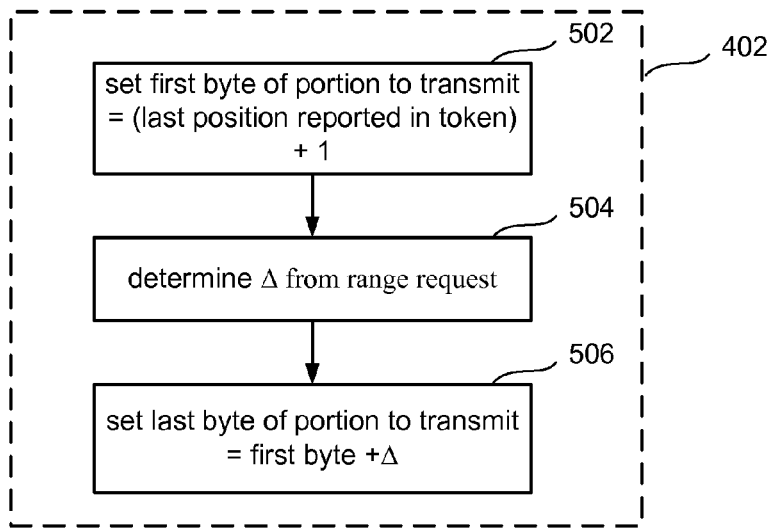
FIG. 10 is a flow chart describing one embodiment of a process for translating data ranges.

FIG. 10 is a flow chart describing one embodiment of a process for implementing block 402 of FIG. 8, translating bytes in an HTTP request to byte offsets in the current selected version. In one embodiment, the token stores a time code for the last byte transmitted to the client. In another embodiment, the token can store a byte offset in the version of the file being served for the last byte transmitted. The process of FIG. 10 is for the embodiment where the token stores a byte offset for the last byte served from the current version. The process of FIG. 10 (block 402) assumes that the version is not being switched. Therefore, in block 502, the first byte of the next portion to be downloaded will be equal to the byte position reported in the token plus one. In block 504, a Δ will be determined from the range request. In one embodiment, the Δ is equal to the difference in the two byte numbers in the range request. For example, if the client 10 is requesting bytes 0-999, then Δ equals 999. In block 506, the last byte of the portion of the data to be downloaded will be equal to the first byte plus Δ.

Figure 11:
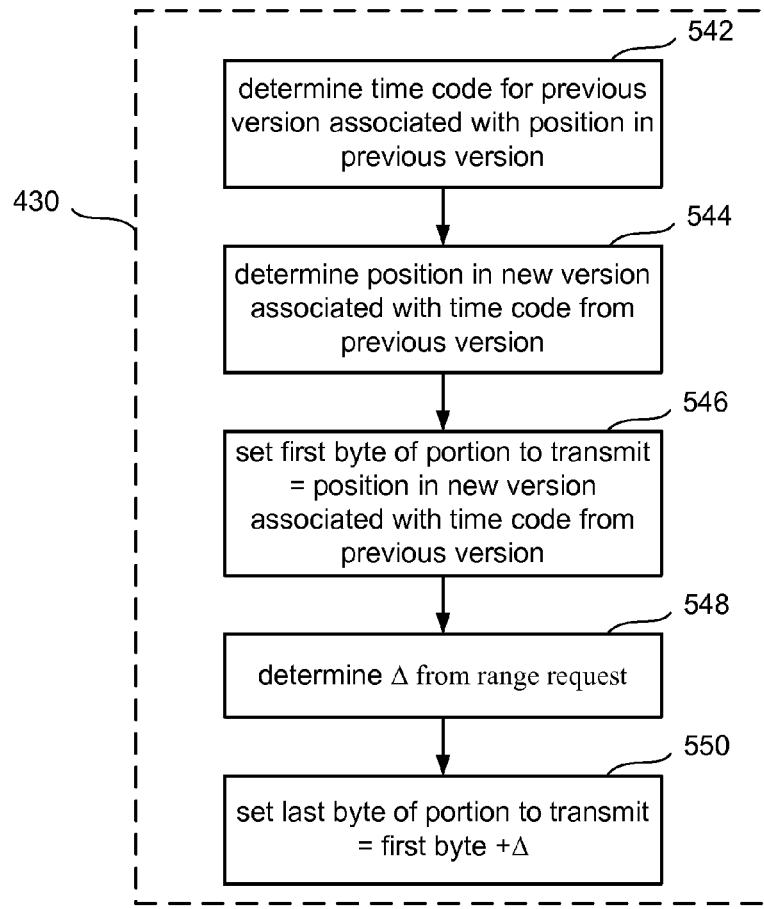
FIG. 11 is a flow chart describing one embodiment of a process for translating data ranges.

FIG. 11 is a flow chart describing one embodiment for implementing block 430 (translating bytes in the request to the bytes in a new version that the server is switching to) for the embodiment where the token stores the byte offset for the last byte downloaded in the previous request from the client. In block 540, server 30 determines the time code in the previous version associated with the position in the previous version of the last byte served. That is, the token identifies the previous version for which data was served form and the byte offset for the last byte served in the previous version. Server 30 will use that byte offset to access the appropriate media file and determine the time code associated with that byte offset. Interpolation may be needed. In block 542, the time code determined in block 540 will be used to access the new media file for the new version being switched to. That time code will be used to identify an associated byte offset. In some embodiments, interpolation may be needed. In block 544, the first byte to be downloaded in response to the current HTTP request will be the byte position in the new version determined in block 542. In block 546, server 30 will determine the Δ between the starting and ending point in the range request from client 10 (similar to block 504). In block 548, the last byte of the portion to be downloaded to the client will be set as the first byte plus the Δ.

Figure 12:
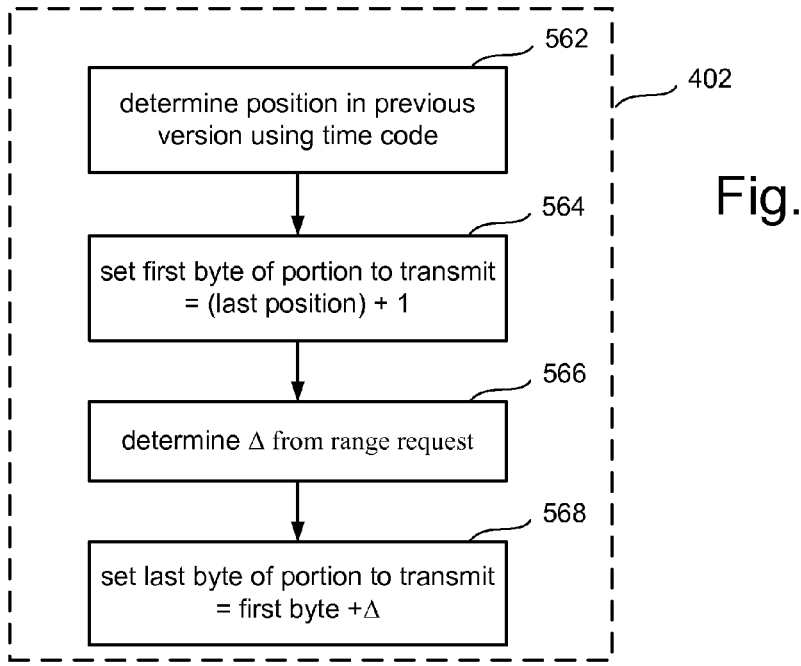
FIG. 12 is a flow chart describing one embodiment of a process for translating data ranges.
Figure 13:
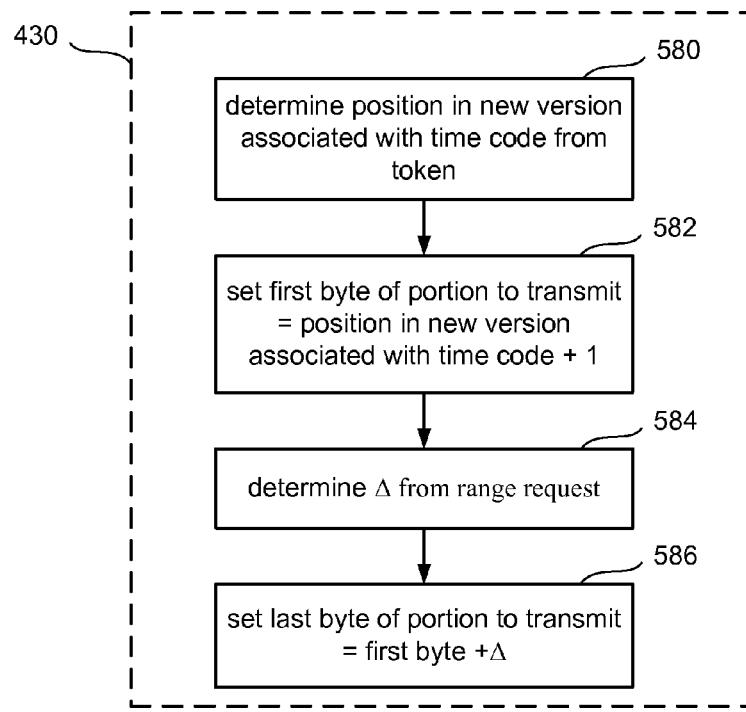
FIG. 13 is a flow chart describing one embodiment of a process for translating data ranges.

As mentioned above, FIGS. 10 and 11 pertain to an embodiment where the token stores the byte offset of the last byte transmitted to the client. FIGS. 12 and 13 describe an embodiment where the token stores the time code associated with the last byte sent to client 10. More specifically, FIG. 12 is a flow chart describing an embodiment of implementing block 402 (transmitting bytes in a request to bytes in the currently selected version) where the token identifies the time code for the last byte sent. In block 562, server 30 will determine the byte offset position in the currently chosen version of the content using the time code from the token. Interpolation may be needed. In block 564, the first byte of the portion to be downloaded in response to the current request from client 10 will be the byte offset determined in block 562 plus one. In block 566, server 30 will determine a Δ in the range request (similar to block 404). In block 568, server 30 sets the last byte in the portion of data to be streamed in response to the current request to be equal to the first byte determined in block 562 plus the Δ determined in block 566.

FIG. 13 is a flow chart describing one embodiment of implementing block 430 where the token reports the time code rather than a byte offset. In block 580, server 30 determines a position in the new version to be switched to that is associated with the time code from the token. Block 580 includes identifying the byte offset in the new version that is associated with the time code. In block 582, the first byte of the portion to be downloaded in response to the current request is set to be the position (plus one byte) in the new version identified in block 580. In block 584, server 30 determines the Δ in the range request (similar to block 504). In block 586, server sets the last byte in the portion to be downloaded equal to the first byte identified in block 582 plus the Δ identified in block 584.

Looking back at FIG. 9, block 432 includes the server obtaining bytes determined in block 430 to download, stream or otherwise transmit the data to client 10. In the case of FIG. 9, that data is for a new version of a file. For the best customer experience, the data stream switching should be as seamless as possible. In one embodiment, therefore, the switching should happen on a key frame. When encoding video, it is typical to encode the data as a key frame and a set of changes from that key frame. That is, an encoder will identify one frame of video to be the key frame. All (or most) of the image data for that key frame will be stored in the media file. For a set of subsequent frames, the encoder will not store all the image data in the media file. Rather, the encoder will only store changes in a subsequent frame identifying how that subsequent frame differs from the key frame. After the set of subsequent frames, another key frame will be stored and it will have its additional subsequent frames. The frequency of key frames is dependent on the encoder.

One issue is that different bit rate streams will not necessarily have their key frames at the same locations. For example, one version may have its key frames at 1:38, and another version could have its key frames at 1:34 and 1:41. In this case, switching between the versions would have to start at either 1:34 or 1:41, which can result in either a backward skip of four seconds (1:38 to 1:34) or a forward of three seconds (1:38 to 1:41). In either instance, it is possible for the user to observe a glitch in the video. In one embodiment, the system accepts this small glitch. In another embodiment, the glitch can be mitigated by requiring the encoder that encodes all versions of the content to keep the key frames close to each other so there are a lot of key frames and the gaps between key frames is small, thereby minimizing the glitch. Another embodiment is to dynamically generate a key frame at the appropriate location in the new file to be switched to so that there will be no (or a minimal) glitch. Generating a key frame includes adding the key frame to the video content at the start of the portion about to be downloaded and adjusting other frames after that key frame in light of the key frame.

FIG. 14 is flow chart describing one embodiment of performing block 432 (obtaining the bytes to transmit to client 10) for the embodiment where the system is going to live with a small glitch. In block 602, server 30 accesses the first byte of data to be downloaded and identifies the image associated with that byte. In block 604, server 30 determines whether this image is a key frame. If it is a key frame, then in block 606, server 30 will access the bytes for the portion to be downloaded and transmit it without having to do any adjustments for key frames. If, in block 604, it is determined that the image associated with the first requested byte is not a key frame, then in block 608 server 30 will find the next key frame in the video. In block 610, server 30 identifies the first byte for the next key frame identified in block 608. In block 612, server 30 will determine an offset from the first byte for the data supposed to be downloaded to the first byte of the key frame. This offset will be used to adjust the range of data to be downloaded in block 614. For example, if server 30 was intending to transmit bytes 2000-2999 to client 10, and the first key frame starts at 2050, then server 30 will instead adjust the byte range to be transmitted to 2050-3049 in block 614. In block 616, those bytes of data identified in block 614 are accessed for transmission to client 10.

FIG. 15 is a flow chart describing an embodiment of a process for performing block 432 (server obtains determined bytes) for the embodiment where the server will create a new key frame if the portion of data to be transmitted is not on a key frame boundary. In block 640, server 30 accesses the first byte of the data to be transmitted to the client 10 and identifies the image associated with that first byte. If that image is a key frame (block 642) then server 30 will obtain the bytes previously identified for transmission to client 10 in block 644. If that first image identified in block 640 is not a key frame, then in block 646, server 30 will create a key frame for that first image. Creating key frames is well known in the art. In block 648, data for the frames following the newly created key frame and prior to the next key frame will be re-encoded so that they identify differences from the key frame created in block 646. In block 650, the byte offsets for the media file being operated on will need to be reset or otherwise adjusted to account for the creation of the new key frame and the change in subsequent frames after the new key frame. Time codes may also need to be adjusted. In block 652, server 30 will access the appropriate set of bytes for transmission to client 10.

FIG. 16 provides an example of how server 30 can switch streams while providing content to a client 10. FIG. 16 shows portions of data files for five versions (Version 0 [lowest quality], Version 1, Version 2, Version 3 and Version 4 [highest quality]). When client 10 first requests particular content, serve 30 will access a marker file in data store 38 to identify the appropriate marker file. That marker file will identify the five versions depicted in FIG. 16. In response to the original request, server 30 will respond with a number of bytes found in Version 4. Client 10 will then request a first range of bytes (0 to XA). In response, server 30 will provide portion A of Version 0. In a second request, client 10 will request bytes (XA+1) to (XB). In response to that request, server 30 will provide portion B of Version 0. For this example, it is assumed that server 30 was unable to conclude that client 10 can handle a higher quality version; therefore, the response to the second request will also be from the lowest quality version, Version 0. The third request from the client 10 will be for bytes (XB+1) to (XC). While monitoring the transmission of portion B from Version 0, server 30 determined that client 10 can handle a higher quality version, for example, Version 3. Therefore, in response to the third request, server 30 will respond from portion C of Version 3. To provide portion C, server 30 will translate byte offset (XB+1) to byte offset (SA) in Version 3, as discussed above. The fourth request from client 10 will be for bytes (XC+1) to (XD). In response, server 30 will provide portion D of Version 3. The fifth request from client 10 will be for bytes (XD+1) to (XE). In response to the fifth request, server 30 will provide portion E of Version 3. The sixth request from client 10 will request byte ranges (XE+1) to (XF). In response to the sixth request, server 30 will provide portion F of Version 3. In the seventh request, client 10 will request bytes (XF+1) to (XG). However, while monitoring the transmission of portion F of Version 3, server 30 determined that client 10 can no longer handle the bandwidth necessary for transmitting Version 3 and, therefore, server 30 determined that it should switch streams to start providing Version 2 to client 10. Thus, in response to the seventh request, server 30 will provide portion G of Version 2 to client 10. As depicted in FIG. 16, portion G is in the middle of Version 2 and starts at byte offset GA. Server 30 performed a translation from byte offset (SF+1) of Version 3 to byte offset GA of Version 2, where offset SF is the last byte in portion F and GA is one more than the byte offset in Version 2 having the same time code as byte offset SF in Version 3. In the eighth request from the client, client 10 will request bytes (XG+1) to (XH). In response to that request, server 30 will provide portion H of Version 2. This process will continue until all the data for the content has been transmitted to client 10.

In some embodiments, each request from client 10 is received at and serviced by the same server 30. In other embodiments, different requests from client 10 for the same content may be received at and serviced by different servers. For example, looking at the CDN of FIG. 2, a first request for a first portion of a movie (or other content) may be received at and serviced by POP1 (e.g., POP1 transmitting portion B of FIG. 16), a second request for a second portion of the movie (or other content) may be received at and serviced by POP2 (e.g., POP2 transmitting portion C of FIG. 16), and a third request for a third portion of the movie (or other content) may be received at and serviced by POP3 (e.g., POP3 transmitting portion C of FIG. 16).

In an alternate embodiment, client 10 will repeatedly fetch N seconds of video at a time (where N is at most a few seconds), and each HTTP GET is just for the next segment of N seconds. Server 30 will only attempt to switch bit-rates on those N-second boundaries. A simple heuristic will be used by server 30 to determine that if it took longer than some fraction of N to deliver the data then server 30 needs to down-shift to a slower bit-rate file (lower quality version). If the data was delivered faster than some fraction of N, then server 30 can up-shift to a higher bit-rate file (higher quality). An example of this embodiment can include an initial request from client 10 of:
http://contentprovider.com/TheMovie
Server 30 responds with a token and the first N seconds of video. The next request from client 10 is:
http://contentrpovider.com/
TheMovie?token=valueFromHeader
Server 30 responds with a token and the first N seconds of video. The token is structured so any of the POPS (or other types of servers) can statelessly decode it. In one example implementation, the token includes the time code of the start of the next segment and the timestamp of when the token is created. So whichever POP receives the request knows what time code to start serving (no matter where in the byte stream) and it knows how much wall clock time passed between the last request and this request in order to determine how fast the client is consuming the data (e.g., transmission rate/bandwith). The server responds by picking the right bit-rate file based on how fast the client consumed the last segment, and then seeks to the right time code offset and returns the next N seconds and an updated token. Key frames are aligned on the N second boundary for smooth switching. Other embodiments discussed above can have the token store the timestamp of when the token is created.

One embodiment includes electronically receiving a request to send a first subset of a set of content, transmitting a first portion of a first version of the set content in response to the request for the first subset of the set of content, transmitting state information with the first portion of the first version of the set of content (the state information identifies the first version of the set of content and a position in the first version of the set of content), monitoring the transmitting of the first portion of the first version of the set of content and determining a transmission rate, receiving a request to send a second subset of the set of content (the request for the second set of set of content includes the state information), determining whether to change versions of the set of content based on comparing the transmission rate to one or more thresholds associated with one or more other versions of the set of content, identifying a second portion of the first version of the set of content using the state information received with the request for the second subset and transmitting the second portion of the first version of the set of content in response to the request for the second subset if the comparing the transmission rate to the one or more thresholds does not indicate to change versions, and identifying a first portion of a second version of the set of content using the state information received with the request for the second subset and transmitting the first portion of the second version of the set of content in response to the request for the second subset if the comparing the transmission rate to the one or more thresholds does indicate to change versions. Each of the versions of the set of content is at a different quality level. The use of the labels "first" and "second" herein is for purposes of identifying and/or distinguishing between items, and is not for purposes of identifying order or timing.

One embodiment includes transmitting one or more portions of a first version of a set of content from a server to a client, determining at the server whether to switch versions of the set of content, transmitting additional one or more portions of the first version of the set of content to the client if it is determined to not switch versions of the set of content, and transmitting one or more portions of a second version of the set of content to the client if it is determined to switch versions of the set of content. The first version of the set of content and the second version of the set of content are at different quality levels.

One embodiment includes electronically receiving a request to send a first subset of a set of content, transmitting a first portion of a first version of the set of content in response to the request for the first subset of the set of content, electronically receiving a request to send a second subset of the set of content, determining whether to switch versions of the set of content, transmitting a second portion of the first version of the set of content in response to the request to send the second subset of the set of content if it is determined not to switch versions of the set of content, and transmitting a first portion of a second version of the set of content in response to the request to send the second subset of the set of content if it is determined to switch versions of the set of content, the first version of the set of content and the second version of the set of content are at different quality levels.

One embodiment includes transmitting content from a server to a client. The server has access to multiple versions of the content. Each version is at a different quality level. The transmitting content includes choosing and transmitting one version of the multiple versions of the content. The method further includes determining bandwidth information for the client and dynamically adjusting the transmitting content by determining whether to switch and switching versions during delivery of the content in order to adapt to the bandwidth information. The determining whether to switch and switching versions during delivery is performed at the server.

One embodiment includes one or more processor readable storage devices having processor readable code embodied on the processor readable storage devices. The processor readable code is for programming one or more processors to perform a method that comprises electronically receiving a request to send a first subset of a set of content, transmitting a first portion of a first version of the set of content in response to the request for the first subset of the set of content, electronically receiving a request to send a second subset of the set of content, determining whether to switch versions of the set of content, transmitting a second portion of the first version of the set of content in response to the request to send the second subset of the set of content if it is determined not to switch versions of the set of content, and transmitting a first portion of a second version of the set of content in response to the request to send the second subset of the set of content if it is determined to switch versions of the set of content, the first version of the set of content and the second version of the set of content are at different quality levels.

One embodiment includes one or more storage devices storing content, a communication interface, and one or more processors in communication with the one or more storage devices and the communication interface. The one or more processors transmit one or more portions of a first version of a set content to a client and determine whether to switch versions of the set of content. The one or more processors transmit additional one or more portions of the first version of the set of content to the client if it is determined to not switch versions of the set of content. The one or more processors transmit one or more portions of a second version of the set of content to the client if it is determined to switch versions of the set of content. The first version of the set of content and the second version of the set of content are at different quality levels.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A method of providing content, comprising:
under control of one or more computer systems configured with executable instructions,
receiving, from a client to a content provider, a first request for a first subset of the content, the content corresponding to a plurality of versions, each of the plurality of versions corresponding to a different quality level;
transmitting, from the content provider to the client, a first portion of the content in response to the first request, the first portion comprising a default version of the content and corresponding to the first request for the first subset of the content;
determining, by the content provider, a transmission rate at which the client receives the first portion of the content;
receiving, from the client to the content provider, a second request for a second subset of the content;
estimating, by the content provider, a respective bit rate for transmitting each of the plurality of versions of the content to the client based at least in part on the transmission rate;
determining, by the content provider, a plurality of threshold values for the plurality of versions of the content, a respective threshold value being based at least in part on the respective bit rate for a respective version of the plurality of versions and a respective predetermined factor based on a respective quality level of the respective version;
selecting, by the content provider, a specific version of the plurality of versions based at least in part on comparing the transmission rate to the plurality of threshold values;
generating a new key frame based at least in part on a first frame of the specific version in response to determining that the first frame is between key frames, the first frame corresponding to a start of the second subset of the content;
re-encoding one or more frames of the specific version based at least in part on the new key frame, the one or more re-encoded frames following the first frame and sequenced prior to a next key frame of the specific version; and
transmitting, from the content provider to the client, a second portion of the content in response to the second request, the second portion comprising the new key frame, the one or more re-encoded frames, and a remaining portion of the specific version that follows the next key frame and that corresponds to the second request for the second subset of the content.

2. The method of claim 1, further comprising:
transmitting state information relating to the first portion of the content, the state information identifying the default version of the content and a first position in the default version of the content, the first position corresponding at least in part to the first subset of the content, the second request for the second subset of the content including the state information;

identifying the second portion of the content using the state information received with the second request for the second subset; and generating updated state information that identifies the specific version and a second position in the specific version of the content, the second position corresponding at least in part to the second subset of the content; and transmitting the updated state information relating to the second portion of the content.

3. The method of claim 2, wherein identifying the second portion of the content using the state information further includes:

identifying a time value associated with the first position in the default version of the content; and identifying a byte position in the specific version of the content that is associated with the time value.

4. The method of claim 1, wherein:

a first point of presence of a content delivery network receives the first request and transmits the first portion of the content; and a second point of presence of the content delivery network receives the second request and transmits the second portion of the content.

5. A method of providing content, comprising:

under control of one or more computer systems configured with executable instructions, transmitting, from a content provider to a client, a first portion of the content, the content corresponding to a plurality of versions, each of the plurality of versions corresponding to a different quality level, the first portion comprising a default version of the content;

determining, by the content provider, a transmission rate at which the client receives the first portion of the content;

estimating, by the content provider, a respective bit rate for transmitting each of the plurality of versions of the content to the client based at least in part on the transmission rate;

determining, by the content provider, a plurality of threshold values for the plurality of versions of the content, a respective threshold value being based at least in part on the respective bit rate for a respective version of the plurality of versions and a respective predetermined factor based on a respective quality level of the respective version;

selecting, by the content provider, a specific version of the plurality of versions based at least in part on comparing the transmission rate to the plurality of threshold values;

generating a new key frame based at least in part on a first frame of the specific version in response to determining that the first frame is between key frames, the first frame corresponding to a start of a second portion of the content;

re-encoding one or more frames of the specific version based at least in part on the new key frame, the one or more re-encoded frames following the first frame and sequenced prior to a next key frame of the specific version; and transmitting, from the content provider to the client, the second portion of the content, the second portion comprising the new key frame, the one or more re-encoded frames, and a remaining portion of the specific version that follows the next key frame.

6. The method of claim 5, further comprising transmitting a first identification of the default version of the content and a first position in the default version of the content relating to the first portion of the content;

receiving a request for the second portion of the content, the request including the first identification of the default version of the content and the first position in the default version of the content;

identifying the second portion of the content using at least the first identification of the default version and the first position, the first position being translated to a position in the specific version of the content if the specific version is not the default version; and transmitting a second identification of the specific version of the content and a second position in the specific version of the content relating to the second portion.

7. The method of claim 6, wherein translating the first position comprises:

identifying a time code based on the first position in the default version of the content; and identifying a data position in the specific version of the content based on the time code.

8. The method of claim 6, wherein identifying the second portion of the content further comprises:

identifying a data position in the specific version of the content based on the first position in the default version of the content, the first position in the default version of the content corresponding to a time value.

9. The method of claim 5, wherein:

a first point of presence of a content delivery network transmits the first portion of the content; and a second point of presence of the content delivery network transmits the second portion of the content.

10. The method of claim 5, wherein:

the default version of the content and the specific version of the content are not a same quality level; and the first portion and the second portion are portions of a common video.

11. A method of providing content, comprising:

under control of one or more computer systems configured with executable instructions, receiving, from a client to a content provider, a first request for the content, the content corresponding to a plurality of versions, each of the plurality of versions corresponding to a different quality level;

sending, from the content provider to the client, an acknowledgement of the first request, the acknowledgement including information about a first version of the content;

receiving, from the client to the content provider, a second request for a first range in the first version of the content;

transmitting, from the content provider to the client, a first portion of the content in response to the second request, the first portion comprising a default version of the content and corresponding to the first range in the first version of the content;

determining, by the content provider, a transmission rate at which the client receives the first portion of the content;

receiving, from the client to the content provider, a third request for a second range in the first version of the content;

estimating, by the content provider, a respective bit rate for transmitting each of the plurality of versions of the content to the client based at least in part on the transmission rate;

determining, by the content provider, a plurality of threshold values for the plurality of versions of the content, a respective threshold value being based at least in part on the respective bit rate for a respective version of the plurality of versions and a respective predetermined factor based on a respective quality level of the respective version;

selecting, by the content provider, a specific version of the plurality of versions based at least in part on comparing the transmission rate to the plurality of threshold values;

generating a new key frame based at least in part on a first frame of the specific version in response to determining that the first frame is between key frames, the first frame corresponding to a start of the second range in the first version of the content;

re-encoding one or more frames of the specific version based at least in part on the new key frame, the one or more re-encoded frames following the first frame and sequenced prior to a next key frame of the specific version; and transmitting, from the content provider to the client, a second portion of the content in response to the third request, the second portion comprising the new key frame, the one or more re-encoded frames, and a remaining portion of the specific version that follows the next key frame and that corresponds the second range in the first version of the content.

12. The method of claim 11, further comprising:
in response to transmitting the second portion of the content, receiving a fourth request for a third range in the first version of the content;
determining a second transmission rate of transmitting the second portion of the content;
selecting a second version of the plurality of versions based at least in part on the second transmission rate; and
transmitting a third portion of the content in response to the third request, the third portion comprising the second version of the content and corresponding to the third range in the first version of the content.

13. The method of claim 11, further comprising:
transmitting a first identification of the default version of the content and a first position in the default version of the content; and
transmitting a second identification of the specific version of the content and a second position in the specific version of the content,
wherein the second request includes the first identification of the default version of the content and the first position in the default version of the content, and
wherein the third request includes the second identification of the specific version of the content and the second position in the specific version of the content.

14. One or more processor readable storage devices having processor readable code embodied on the one or more processor readable storage devices, the processor readable code for programming one or more processors to perform a method comprising:
receiving, from a client to a content provider, a first request for the content, the content corresponding to a plurality of versions, each of the plurality of versions corresponding to a different quality level;

sending, from the content provider to the client, an acknowledgement of the first request, the acknowledgement including information about a first version of the content;

receiving, from the client to the content provider, a second request for a first range in the first version of the content;

transmitting, from the content provider to the client, a first portion of the content in response to the second request, the first portion comprising a default version of the content and corresponding to the first range in the first version of the content;

determining, by the content provider, a transmission rate at which the client receives the first portion of the content;

receiving, from the client to the content provider, a third request for a second range in the first version of the content;

estimating, by the content provider, a respective bit rate for transmitting each of the plurality of versions of the content to the client based at least in part on the transmission rate;

determining, by the content provider, a plurality of threshold values for the plurality of versions of the content, a respective threshold value being based at least in part on the respective bit rate for a respective version of the plurality of versions and a respective predetermined factor based on a respective quality level of the respective version;

selecting, by the content provider, a specific version of the plurality of versions based at least in part on comparing the transmission rate to the plurality of threshold values;

generating a new key frame based at least in part on a first frame of the specific version in response to determining that the first frame is between key frames, the first frame corresponding to a start of the second range in the first version of the content;

re-encoding one or more frames of the specific version based at least in part on the new key frame, the one or more re-encoded frames following the first frame and sequenced prior to a next key frame of the specific version; and transmitting, from the content provider to the client, a second portion of the content in response to the third request, the second portion comprising the new key frame, the one or more re-encoded frames, and a remaining portion of the specific version that follows the next key frame and that corresponds to the second range in the first version of the content.

15. The one or more processor readable storage devices of claim 14, the method further comprising:
transmitting a first identification of the default version of the content and a first position in the default version of the content; and
transmitting a second identification of the specific version of the content and a second position in the specific version of the content,
wherein the second request includes the first identification of the default version of the content and the first position in the default version of the content, and
wherein the third request includes the second identification of the specific version of the content and the second position in the specific version of the content.

16. A system for providing content, comprising:
a processor; and
a memory device including instructions that, when executed by the processor, cause the processor to:
transmit, from a content provider to a client, a first portion of the content, the content corresponding to a plurality of versions, each of the plurality of versions corresponding to a different quality level, the first portion comprising a default version of the content;

determine, by the content provider, a transmission rate at which the client receives the first portion of the content;

estimate, by the content provider, a respective bit rate for transmitting each of the plurality of versions of the content to the client based at least in part on the transmission rate;

determine, by the content provider, a plurality of threshold values for the plurality of versions of the content, a respective threshold value being based at least in part on the respective bit rate for a respective version of the plurality of versions and a respective predetermined factor based on a respective quality level of the respective version;

select, by the content provider, a specific version of the plurality of versions based at least in part on comparing the transmission rate to the plurality of threshold values;

generate a new key frame based at least in part on a first frame of the specific version in response to determining that the first frame is between key frames, the first frame corresponding to a start of a second portion of the content;

re-encode one or more frames of the specific version based at least in part on the new key frame, the one or more re-encoded frames following the first frame and sequenced prior to a next key frame of the specific version; and transmit, from the content provider to the client, the second portion of the content, the second portion comprising the new key frame, the one or more re-encoded frames, and a remaining portion of the specific version that follows the next key frame.

17. The system of claim 16, wherein the memory device includes the instructions that, when executed by the processor, further cause the processor to:

transmit a first identification of the default version of the content and a first position in the default version of the content relating to the first portion of the content;

receive a request for the second portion of the content, the request including the first identification of the default version of the content and the first position in the default version of the content;

identify the second portion of the content using at least the first identification of the default version and the first position, the first position being translated to a position in the specific version of the content if the specific version is not the default version; and transmit a second identification of the specific version of the content and a second position in the specific version of the content relating to the second portion.

* * * * *